United States Patent
Chiou et al.

(10) Patent No.: US 8,401,296 B2
(45) Date of Patent: Mar. 19, 2013

(54) IMAGE PROCESSING METHOD FOR LOCATING AND RECOGNIZING BARCODES IN IMAGE FRAME, COMPUTER READABLE STORAGE MEDIUM, AND IMAGE PROCESSING APPARATUS

(75) Inventors: Hann-Huei Chiou, Taipei (TW); Yu-Ching Lee, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 311 days.

(21) Appl. No.: 12/887,469

(22) Filed: Sep. 21, 2010

(65) Prior Publication Data

US 2011/0075931 A1   Mar. 31, 2011

(30) Foreign Application Priority Data

Sep. 25, 2009  (CN) .......................... 2009 1 0175759
Aug. 19, 2010  (CN) .......................... 2010 1 0262803

(51) Int. Cl.
*G06K 9/00*  (2006.01)
*G06K 7/10*  (2006.01)

(52) U.S. Cl. ..................................... 382/181; 235/462.1
(58) Field of Classification Search .................. 382/181, 382/183, 218; 235/462.01, 462.02, 462.05, 235/462.08, 462.11, 462.1
See application file for complete search history.

(56) References Cited

U.S. PATENT DOCUMENTS 6,129,278 A  * 10/2000  Wang et al.  .............. 235/462.01
6,446,870 B1 *  9/2002  Rando  ...................... 235/462.43

* cited by examiner

*Primary Examiner* — Daniel Mariam

(57) ABSTRACT

An image processing method of locating and recognizing barcodes in an image frame is applicable to an image processing apparatus. The method is to define plural scan tracks on the sample image frame, and the image processing apparatus searches for the section(s) possibly having the barcode, along each scan track. If the section(s) possibly having the barcode found on two neighboring scan tracks by the image processing apparatus is located at an approximate horizontal axis position, the image processing apparatus determines that a quadrilateral area defined by the two sections possibly having the barcode is an area possibly having the barcode. Therefore, the image processing apparatus can quickly locate and recognize the barcode area in the image frame.

21 Claims, 6 Drawing Sheets

IMAGE PROCESSING METHOD FOR LOCATING AND RECOGNIZING BARCODES IN IMAGE FRAME, COMPUTER READABLE STORAGE MEDIUM, AND IMAGE PROCESSING APPARATUS

CROSS-REFERENCES TO RELATED APPLICATIONS

This non-provisional application claims priority under 35 U.S.C. §119(a) on Patent Application Nos. 200910175759.2 and 201010262803.6 filed in China on Sep. 25, 2009 and Aug. 19, 2010, the entire contents of which are hereby incorporated by reference.

BACKGROUND OF THE INVENTION

1. Field of Invention

The present invention relates to an image processing method, and more particularly to an image processing method of locating and capturing a plurality of barcode areas in an image frame.

2. Related Art

By executing a barcode recognition program, a common data processing device can capture and recognize a barcode to be recognized through a built-in or external camera to acquire barcode information.

FIG. 1 shows a sample image frame 1 having a barcode. In a recognition method adopted in current recognition program, it is to define a horizontal line 2 at the center of the sample image frame 1, such that the horizontal line passes through all the bar blocks forming the barcode. Next, the data processing device that executes the barcode recognition program acquires pixels on the horizontal line 2 along the aforementioned horizontal line 2 one by one. Subsequently, the data processing device calculates gray level values of all pixels (the common formula for calculating the gray level value is: Gray level=0.299R+0.587G+0.144B), thereby finding a central point of the barcode area. And then the data processing device searches for the boundaries in the left and right. After the boundaries are determined, the barcode area in the sample image frame may be determined, and a Binarization process is performed on the barcode area, thereby further recognizing the barcode information.

This method is simple, but a single scan track may easily cause misjudgment of the barcode area, which causes that the data processing device cannot really find the barcode area, or that the area without the barcode is misjudged as the barcode area, which causes inconveniences to the user. Furthermore, when the sample image frame is acquired, the user has to keep the aforementioned horizontal line to pass through the barcode, and thus completing the barcode recognition. On the printing medium with multiple barcodes, one sample image frame has to be acquired for each barcode, thus recognizing each barcode individually through the aforementioned horizontal line.

As shown in FIG. 2, in another method adopted in the recognition program, an entire sample image frame is processed. The data processing device that executes the recognition program first calculates the gray level value of each pixel, then the data processing device enhances black and white contrast of the sample image frame by using a variety of filters, for example, a Medium Filter. Finally the data processing device uses various masks, for example, a Sobel mask to locate the barcode area. FIG. 2 is a partial enlarged view of a sample image frame processed by a filter. In FIG. 2, the black and white contrast between pixels forming the barcode and the pixels without the barcode is enhanced, thus forming high contrast. Finally, the data processing device may find out the barcode area in the processed sample image frame, thereby recognizing the barcode.

This method is not only applied in the barcode recognition but also applied in other image recognition purposes (for example, car license plate recognition). Since the entire image frame is analyzed in the method, in the situation that an image has multiple barcodes, the data processing device may also find the barcodes one by one, and recognizes the barcodes respectively. However, according to the aforementioned method, all pixels of the sample image frame have to be responsibly processed, which costs a large amount of hardware resources. To a handheld data processing device with relatively low hardware performance, this method requires considerable operation time.

SUMMARY OF THE INVENTION

In the prior art, in the method of sampling the image through a single horizontal line, the user has to manually select the barcode area to acquire a proper sample image frame to perform further barcode recognition. In a situation of multiple barcodes existing to be recognized, the user has to manually select different barcode areas one by one. In the other method for processing the entire sample image frame, the user can perform recognition on multiple barcodes in a single sample image frame without manually selecting the barcode area in the manner of processing, but a large amount of hardware resources are consumed for processing the entire sample image frame.

In order to solve the problem of searching for the barcode to be recognized in the sample image frame, the present invention provides an image processing method of locating and recognizing barcodes in an image frame, for locating and recognizing a barcode in a sample image frame; wherein the sample image frame contains at least one barcode.

The image processing method includes the following steps: acquiring a sample image frame; defining a plurality of scan tracks on the sample image frame, wherein a horizontal axis is defined on the sample image frame, and the scan tracks are in parallel with each other and in parallel with the horizontal axis; acquiring pixels at the positions through which the scan track passes sequentially along each of the scan tracks; calculating a gray level value of each of the pixels on the scan track; verifying whether a section possibly having the barcode exists on the scan track; determining whether the sections possibly having the barcode of two neighboring scan tracks are located at an approximate horizontal axis position, marking a quadrilateral area between the two sections possibly having the barcode as an area possibly having the barcode. Finally, after performing the sampling step on each of the scan tracks, outputting all areas possibly having the barcode.

The present invention further provides an image processing apparatus, applicable to perform image processing on a sample image frame for locating and recognizing a barcode; wherein the sample image frame comprises at least one barcode. The image processing apparatus comprises an image capture module, a data storage device, and a control module.

The image capture module is used for capturing the sample image frame and the data storage device is used for storing the sample image frame. The control module defines a plurality of scan tracks on the sample image frame, wherein a horizontal axis is defined on the sample image frame and the scan tracks are in parallel with each other and in parallel with the horizontal axis.

The control module acquires pixels at the positions through which the scan track passes sequentially along each of the scan tracks, calculates a gray level value of each of the pixels on the scan track, verifies whether a section possibly having the barcode exists on the scan track and stores the section possibly having the barcode in the data storage device, determines whether the sections possibly having the barcode of two neighboring scan tracks are located at an approximate horizontal axis position to mark a quadrilateral area between the two sections possibly having the barcode as an area possibly having the barcode.

The image processing method and image processing apparatus of the present invention can find out all suspected barcode areas in the image through multiple sampling, thus improving the recognition efficiency and accuracy. Meanwhile, the present invention sufficiently improves the ability of locating the barcode area, such that the user is not required to adjust the image capture module repetitively to place the barcode area at the center of the sample image frame, thereby simplifying the use of the recognition program.

The technical schemes and embodiments of the present invention are illustrated in detail below with reference to the accompanying drawings, and the contents are sufficient for persons skilled in the art to understand the technical contents of the present invention and implement the present invention accordingly.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
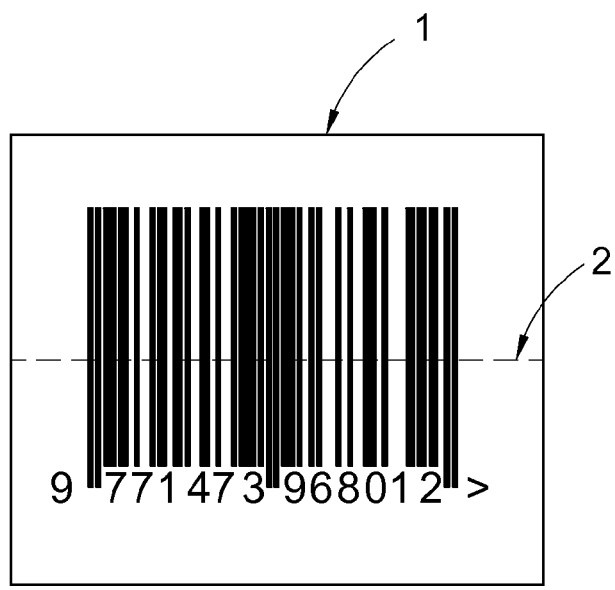
FIG. 1 is schematic view of defining a horizontal line passing through a barcode in the prior art.
Figure 2:
FIG. 2 is a partial enlarged view of a sample image frame processed by a filter in the prior art.
Figure 3:
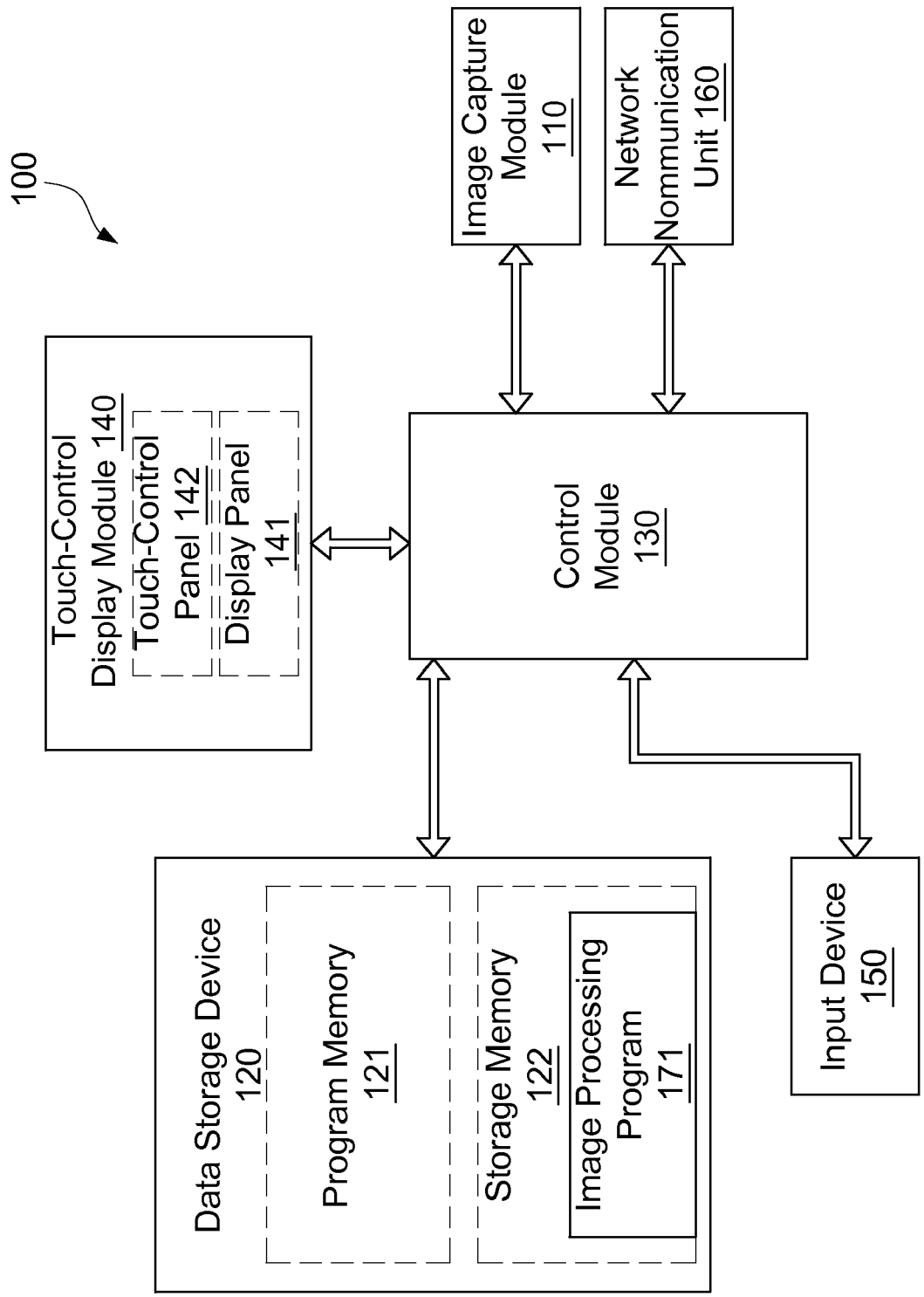
FIG. 3 is a circuit block diagram of an image processing apparatus according to an embodiment of the present invention.

FIG. 3 is a circuit block diagram of an image processing apparatus 100 according to an embodiment of the present invention, for performing the image processing method of locating and recognizing barcodes in an image frame of the present invention. The method and the image processing apparatus 100 for performing the method are applicable for image processing on a static sample image frame, thereby capturing the barcode area of the barcode to recognize barcode information of all barcodes. The image processing apparatus 100 is a handheld data processing device, such as a personal digital assistant (PDA), a portable navigation device (PND) or a smart phone. The image processing apparatus 100 is not limited to a handheld data processing device and may also be a desktop computer or laptop computer.

The image processing apparatus 100 according to an embodiment of the present invention takes a handheld data processing device as an illustration. The image processing apparatus 100 includes an image capture module 110, a data storage device 120, a control module 130, a touch-control display module 140, an input device 150, and a network communication unit 160.

Figure 4:
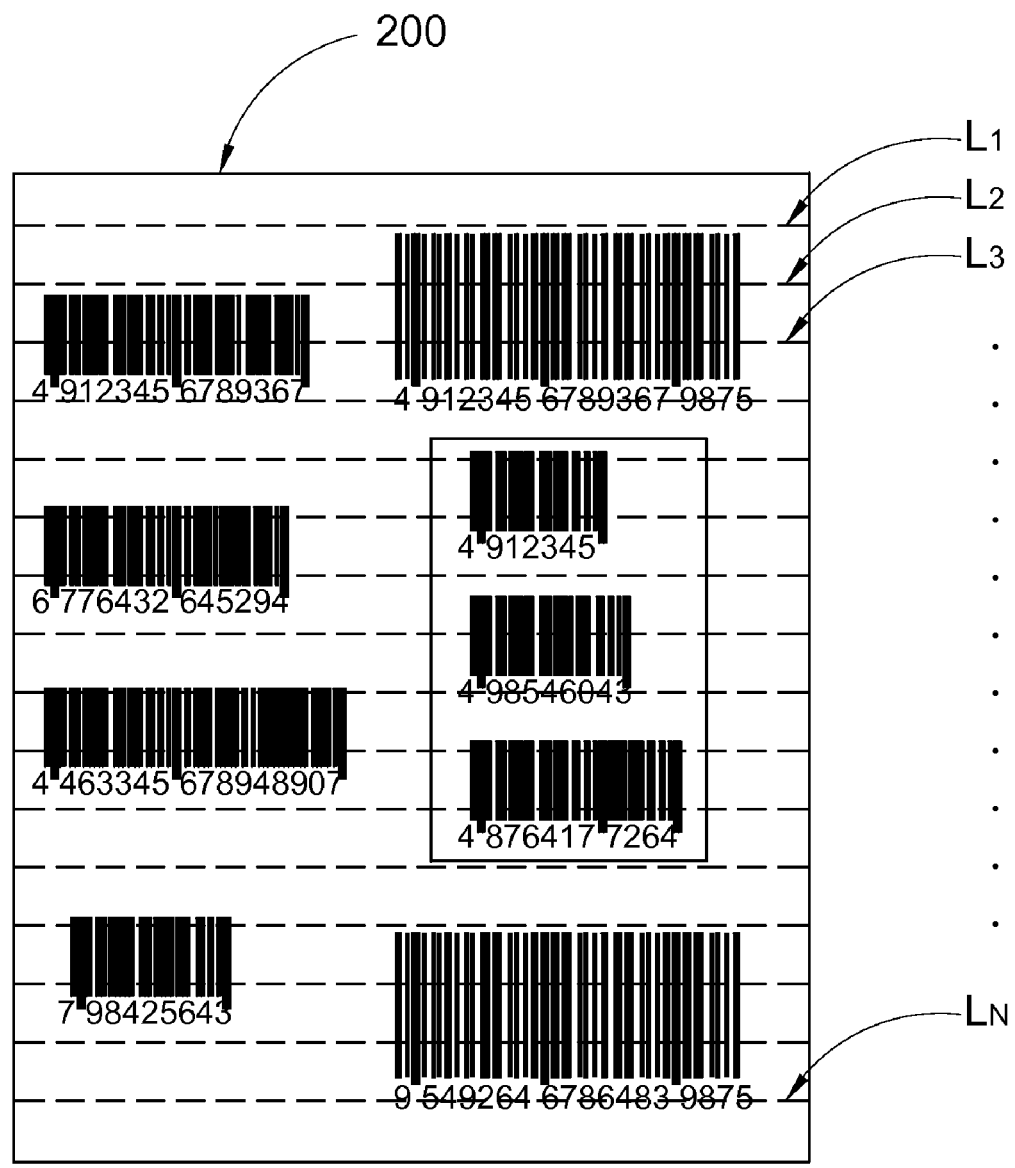
FIG. 4 is a schematic view of a sample image frame having a plurality of barcodes according to an embodiment of the present invention.

As shown in FIGS. 3 and 4, the image capture module 110 is used for capturing a sample image frame 200. The sample image frame 200 includes one or a plurality of barcodes. The image capture module 110 transforms the sample image frame 200 into digital data to facilitate further storage of the sample image frame 200 in the data storage device 120 and processing by the control module 130. The image capture module 110 is a cam/camera which utilizes a complementary metal oxide semiconductor (CMOS) or a charge coupled device (CCD), and preferably a cam/camera having high resolution capability (for example, having a resolution capability above over 1 million pixels) and having an autofocus function for capturing images clearly. Generally speaking, the higher the image resolution is, the more accurate the Binarization result is.

As shown FIG. 3, the data storage device 120 is used to store the sample image frame 200 captured by the image capture module 110. The specification of the data storage device 120 varies according to different types of the image processing apparatus 100, and the data storage device 120 substantially includes a program memory 121 and a storage memory 122. The program memory 121 and the storage memory 122 can be two separated storage modules. The data storage device 120 can be a single storage module, which is divided into two different storage partitions, namely a program memory 121 and a storage memory 122 after being partitioned. Taking a handheld data processing device as an example, the program memory 121 is usually a random access memory for storing an operating system and important resident program, and serves as a space for the handheld data processing device to load and execute programs. The storage memory 122 is a built-in or external NAND Flash memory module for storing general data or non-resident general program files.

The handheld data processing device is taken as an example in the embodiment of the present invention. If the barcode recognition apparatus 100 is a common personal computer, the program memory 121 and the storage memory 122 can be respectively a system memory and a hard disk, and the operating system and important resident programs are installed and stored in the hard disk serving as the storage memory 122.

As shown in FIG. 3, the control module 130 includes a processor, a system logic chipset, and a display interface, and the control module 130 is provided for processing digital data. The processor and system logic chipset can be the combination of multiple electronic components independently disposed on a circuit board, or the processor and system logic chipset can be integrated into a system-on-a-chip (SoC). The control module 130 applied in the handheld data processing device is usually a system SoC. The image capture module 110 is electrically coupled to the control module 130, such that the image capture module 110 is controlled by the control module 130 to capture images and send the images to the control module 130 or the data storage device 120. The data storage device 120 is also electrically coupled to the control module 130, such that the control module 130 accesses data or the sample image frame from the data storage device 120.

As shown in FIG. 3, the touch-control display module 140 receives the display signal sent by the control module 130 through the display interface to display the sample image frame having the barcode. Furthermore, the touch-control display module 140 is touched to generate an operation instruction to the control module 130, so as to operate the image processing apparatus 100.

As shown in FIG. 3, in a preferable embodiment, the touch-control display module 140 includes a display panel 141 and a touch-control panel 142. The display panel 141 receives the display signals of the control module 130 to display the image frames. The touch-control panel 142 is combined with the display panel 141 and is touched to send a corresponding operation instruction to the control module 130, so as to operate the image processing apparatus 100.

As shown in FIG. 3, the input device 150 is electrically connected to the control module 130. The input device 150 can be a key, a computer mouse or a combination thereof. The input device 150 is operated by the user to send an operation instruction to the control module 130, so as to operate the image processing apparatus 100. The network communication unit 160 is connected to the control module 130 for connection to an external network, so the image processing apparatus 100 can establish communication with an external device.

Figure 5:
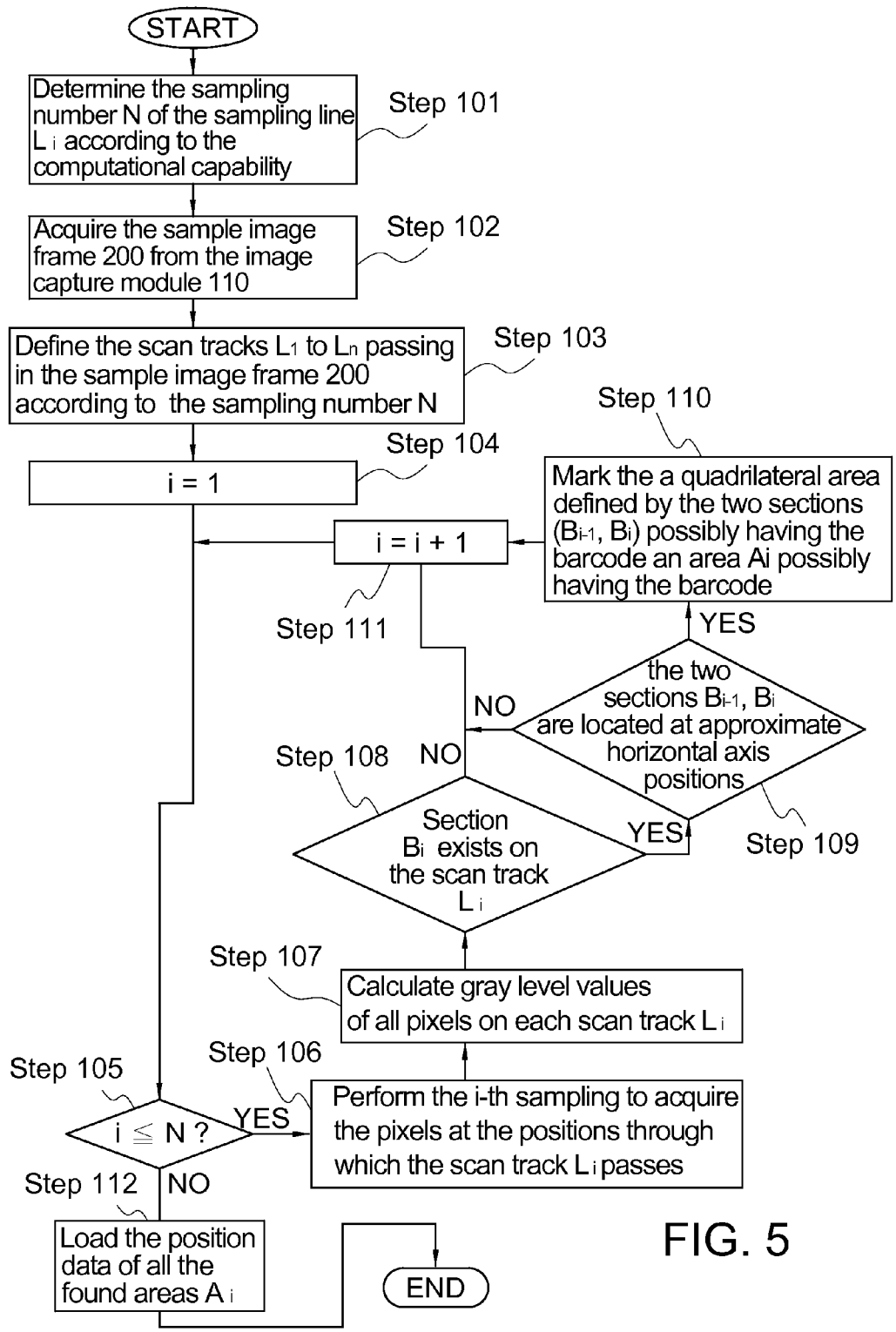
FIG. 5 is a flowchart of an image processing method of the present invention.

Referring to FIGS. 3 and 5, when the image processing apparatus 100 is used to implement the image processing method of the present invention, the control module 130 of the image processing apparatus 100 firstly loads and executes an image processing program 171 from the storage memory 122 of the data storage device 120.

In order to effectively utilize the hardware resource of the image processing apparatus 100 and maintain a good barcode recognition efficiency, after loading and executing a image processing program 171 from the data storage device 120, the control module 130 has to estimate the computational capability of the image processing apparatus 100 in advance to confirm the system resource of the image processing apparatus 100 for barcode recognition in the current software environment and hardware configuration. For example, one of the approaches is that the control module 130 executes a simple program loop, and the time that the control module 130 completes the simple program loop is used to estimate the computational capability of image processing apparatus 100 currently.

After estimating the current computational capability of the image processing device 100, the control module 130 determines a reasonable sampling number N. The aforementioned sampling number N refers to the sampling number N of the sample line $L_i$ when the barcode area is located and captured for each sample image 200, as shown in Step 101. That is to say, for each sample image 200, the control module 130 locates and captures the barcode area along N sample lines $L_1$ to $L_N$. An objective of determining the sampling number N of the sample line $L_i$ is to finish the image processing of each sample image 200 within the reasonable program response time (for example, 400 ms). After estimating the current computational capability of the image processing apparatus 100, the control module 130 determines a reasonable sampling number N. The aforementioned sampling number N refers to the sampling number N of the scan track $L_i$ when the barcode area is located and captured for each sample image frame 200, as shown in Step 101. That is to say, for each sample image frame 200, the control module 130 locates and captures the barcode area along N scan tracks $L_1$ to $L_N$. The purpose of the sampling number N of the scan track $L_i$ is to complete the image processing of each sample image frame 200 within a reasonable program response time (for example, 400 ms).

It is assumed that the image processing apparatus 100 is required to complete searching for all barcodes in the sample image frame 200 in a reasonable program response time (for example, 400 ms), the control module 130 has to deduct a time for barcode information reading on the barcode after each barcode is found from the reasonable program response time, and then divides the residual time by a time for each sampling, thus calculating a proper number N of the scan tracks $L_1$ to $L_n$.

If a vertical axis and a horizontal axis perpendicular to each other are defined on the sample image frame 200, the aforementioned scan tracks $L_1$ to $L_N$ are in parallel with the horizontal axis and are arranged at an equal interval. Ideally, bar blocks of a linear barcode are perpendicular to the scan tracks $L_1$ to $L_N$ (in parallel with the vertical axis) and are arranged along a direction in parallel with the horizontal axis. Furthermore, an upper limit of N is the height of the sample image frame 200 (in the unit of pixel). That is to say, each pixel arranged in a one-dimension array in the horizontal axis direction is only sampled once.

The aforementioned scan tracks $L_1$ to $L_n$ is used for determining a path of searching for the barcode in the sample image frame 200, instead of the real lines practically drawn in the sample image frame 200. However, in order to enable the image capture module 110 to capture the proper sample image frame, the scan tracks $L_1$ to $L_n$ may be displayed on the display panel 141 in advance.

As shown in Step 102, the control module 130 controls the image capture module 110 to capture at least one sample image frame 200, and acquires the sample image frame 200 from the image capture module 110. The control module 130 may also caches the acquired sample image frame 200 in the data storage device 120. In practice, the image capture module 110 continuously captures a dynamic image having the barcode in a dynamic mode and sends the dynamic image to the control module 130.

The control module 130 can display the dynamic image through the display panel 141 of the touch-control display device 140 for the user to preview and confirm whether the image capture module 110 is aligned with the barcode, whether the previewed barcode image is clear, whether the linear barcode is in parallel with the horizontal axis direction, and whether two scan tracks pass through each barcode, thereby improving the barcode recognition accuracy and efficiency at the same time. When the user sends an operation signal to the control module 130 by using the touch-control panel 142 or the input device 150, the control module 130 obtains the last frame in the dynamic image as the sample image frame 200. Or the control module 130 sends different control commands to the image capture module 110, such the image capture module 110 switches to a working mode of higher sampling quality and captures a single photo having a high resolution as the sample image frame 200.

After acquiring the sample image frame 200, the control module 130 defines N scan tracks $L_1$ to $L_N$ on the sample image frame 200 according to the sampling number N of the scan track $L_i$.

The sample image frame 200 in FIG. 5 includes 9 barcodes, and the barcodes may have the same barcode type or to different barcode types.

In Step 103, the control module 130 defines the scan tracks $L_1$ to $L_i$, passing through the sample image frame 200. The scan tracks $L_1$ to $L_n$ are in parallel with each other and in parallel with the horizontal axis, and arranged at an equal interval along the vertical axis to divide the sample image frame 200 into multiple equal parts. As described above, an objective of determining the sampling number N is to complete the image processing of each sample image frame 200 within the reasonable program response time (for example, 400 ms). However, a lower limit of the sampling number N is required to be considered in accordance with the ratio of the size of the barcode to the size of the sample image frame 200, so as to ensure that the scan tracks $L_1$ to $L_n$ pass through each barcode.

Next, according to Steps 105 to Step 111 in FIG. 4, the control module 130 performs the step-loop repetitively, so as to locate and capture the barcode area along each of the scan tracks $L_1$ to $L_n$, and performs the step-loop for N times.

Before entering Step 105, the control module 130 first defines a count value i, and sets an initial value of the count value to 1 (i=1), as shown in Step 104.

When the step-loop starts, the control module 130 firstly determines whether the count value i is smaller than or equal to the sampling number N (i≦N), as shown in Step 105. The control module 130 determines whether the barcode area is located and captured along all scan tracks $L_1$ to $L_n$. If i is smaller than or equal to the sampling number N (i≦N), the work of locating and capturing the barcode area for all the scan tracks is not completed, and at this time the control module 130 continues locating and capturing the barcode area along the i-th sampling line Li (the i-th sampling, that is, current sampling).

When i is smaller than or equal to the sampling number N (i≦N), the control module 130 performs the i-th sampling, that is, the control module 130 acquires the pixels at the positions through which the scan track Li passes on the sample image frame 200 along the i-th sampling line Li, as shown in Step 106.

As shown in Step 107, the control module 130 calculates gray level values of all pixels on each scan track Li and stores the gray level values of all pixels in the data storage device 120.

Next, as shown in Step 108, according to the variations of the aforementioned gray level values, the control module 130 finds whether a section Bi possibly having the barcode exists on the scan track Li. If the section Bi possibly having the barcode exists, the control module 130 stores each section Bi in the data storage device 120.

Figure 6:
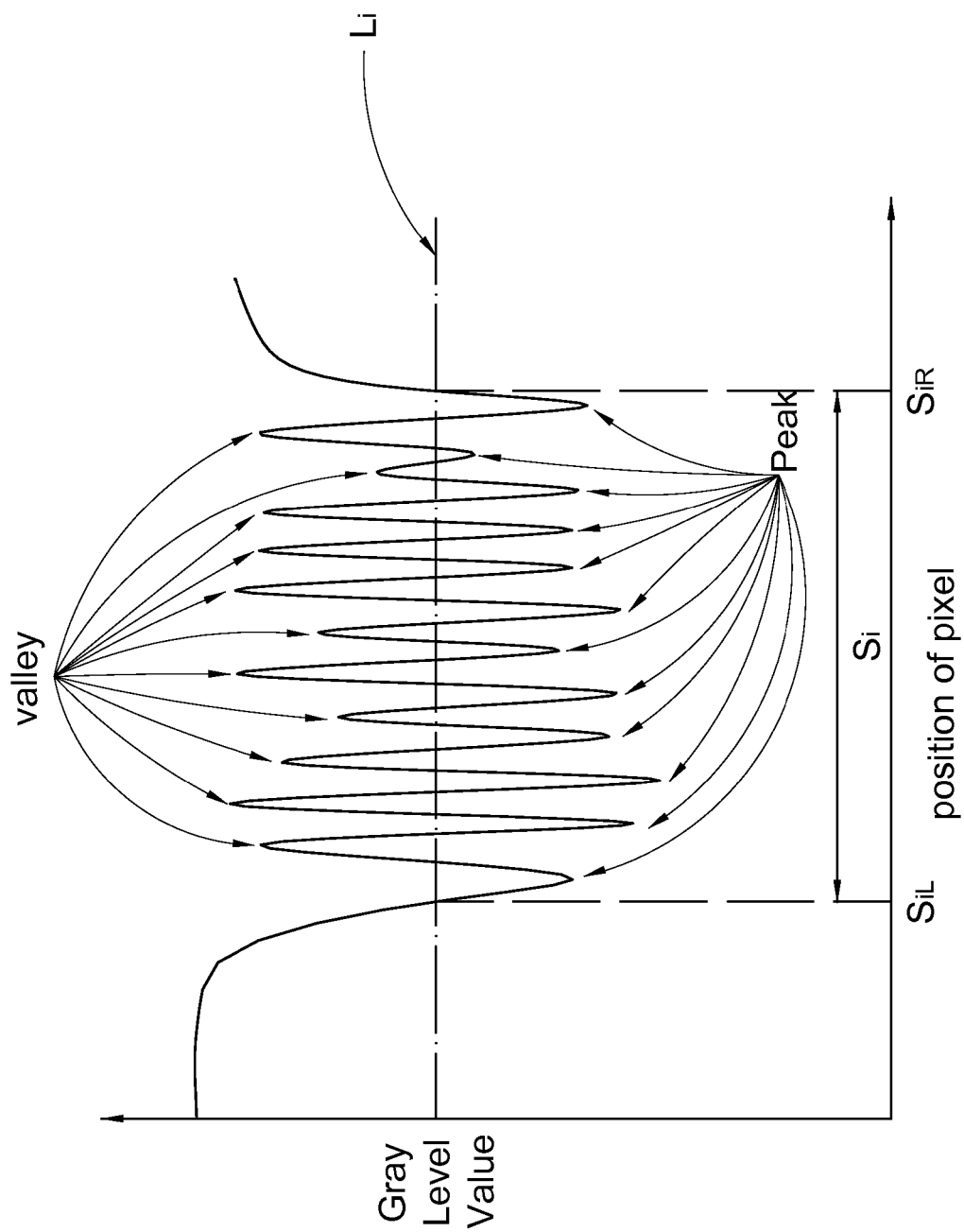
FIG. 6 illustrates a gray level curve defined by gray level values of all pixels on a scan track.

Referring to FIG. 6, in Step 108, the process of finding the section Bi possibly having the barcode is illustrated as follows.

The control module 130 takes the gray level values of pixels as the vertical axis and positions of pixels on the scan track $L_i$ that serves as the horizontal axis, and introduces each gray level value of each pixel to define a gray level curve.

Next, the control module 130 searches for a line section $S_i$ where peaks and valleys of the gray level values densely and alternately appear in the gray level curve. The position of the section $B_i$ possibly having the barcode may be represented by the position $S_{iL}$ of the pixel on the left side of the line section $S_i$ and the position $S_{iR}$ of the pixel on the right side of the line section $S_i$.

Next, the control module 130 marks the position of the line section $S_i$ as the section $B_i$ possibly having the barcode and stores the section $B_i$ to the data storage device 120. Usually, the control module 130 may find a line section Si corresponding to each scan track $L_i$, but the line section $S_i$ may not exist.

Therefore, in N scan tracks $L_1$ to $L_N$, the control module 130 may find N line section $S_i$ where peaks and valleys of the gray level values densely and alternately appear, and marks the corresponding section of the scan track $L_i$ as the section $B_i$ possibly having the barcode. If the section $B_i$ possibly having the barcode is not found on the scan track $L_i$, the control module 130 performs Step 111 and then performs the next step-loop (Steps 105 to Step 111), that is, the next scan track Li+1 performs sampling to find the corresponding section $B_{i+1}$ possibly having the barcode.

Referring to FIG. 4, next, the control module 130 loads the section $B_{i-i}$ possibly having the barcode of a previous scan track $L_{i-1}$ from the data storage device 120, and compares the section $B_i$ possibly having the barcode of the current scan track Li (the i-th sampling) with the section $B_{i-i}$ possibly having the barcode of the previous scan track ((i−1)th sampling), so as to determine whether the two sections $B_{i-i}$, $B_i$ possibly having the barcode are located at approximate horizontal axis positions, as shown in Step 109. If the sections ($B_{i-1}$, $B_i$) possibly having the barcode are located at the approximate horizontal axis positions, a quadrilateral area defined by the two sections ($B_{i-1}$, $B_i$) possibly having the barcode is marked as an area $A_i$ possibly having the barcode and the control module 130 stores the position of the area $A_i$ possibly having the barcode in the data storage device 120, as shown in Step 110.

Ideally, if the bar blocks of the barcode are perpendicular to the scan tracks, the quadrilateral area (the area $A_i$ possibly having the barcode) acquired by the control module 130 should be a rectangle. If the barcode is skewed, the quadrilateral area (the area $A_i$ possibly having the barcode) acquired by the control module 130 should be a parallelogram.

On the contrary, if the two sections ($B_{i-1}$, $B_i$) possibly having the barcode are not located at the approximate horizontal axis positions, the control module 130 performs Step 111 and performs the next step-loop. That is, the control module 130 performs sampling on the next scan track $L_{i+1}$ to find out the corresponding section $B_{i+1}$ possibly having the barcode. Similarly, when the sample scan track is the (L+1)th scan track $L_{i+1}$, the control module 130 loads the section Bi possibly having the barcode of the i-th sampling line $L_i$ from the data storage device 120 and compares the section $B_{i+1}$ possibly having the barcode of the (L+1)th scan track $L_{i+1}$ with the section $B_i$ possibly having the barcode of the previous scan track (the i-th sampling).

Figure 7:
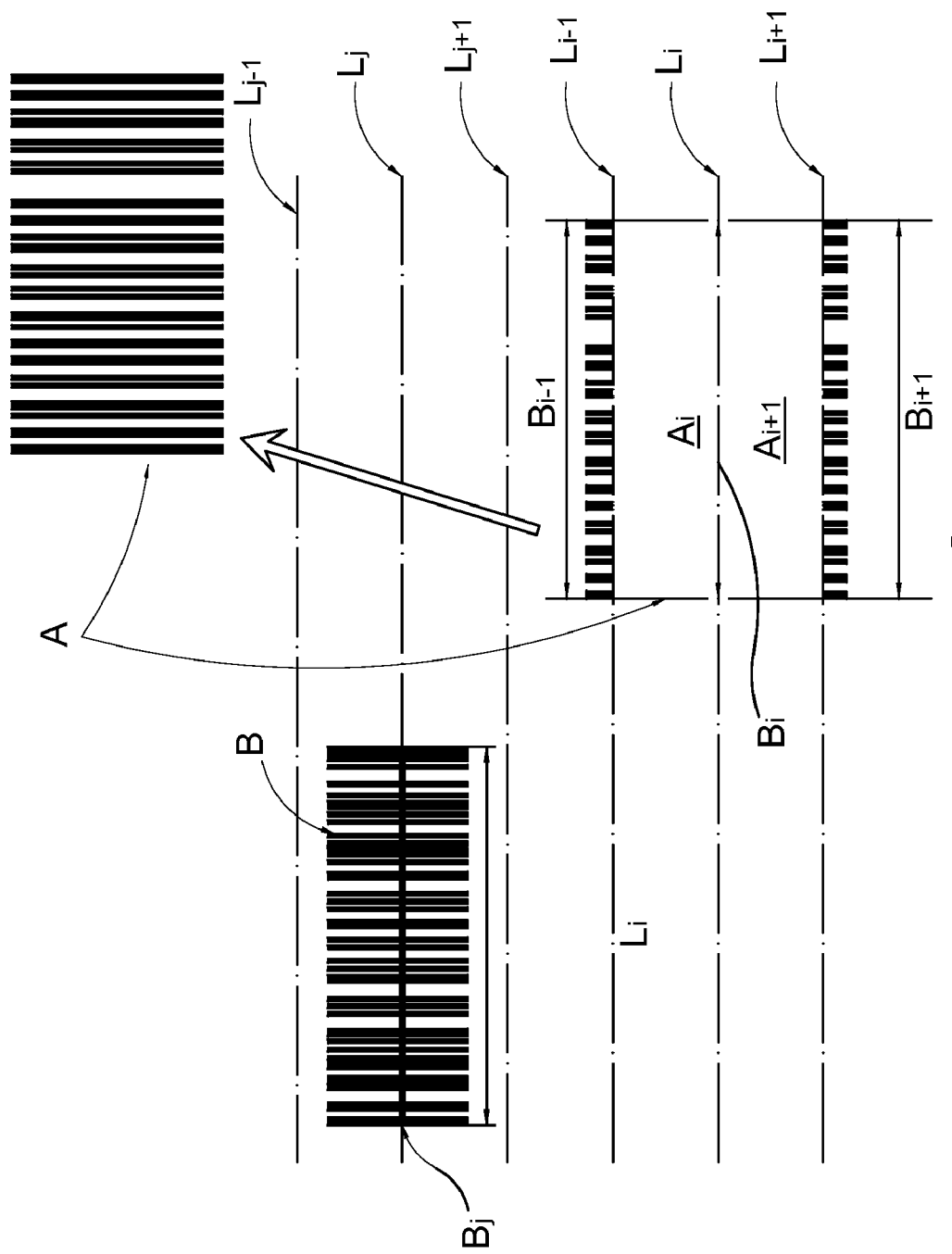
FIG. 7 is a schematic view of capturing an area possibly having the barcode in an image processing method according to the present invention.

FIG. 7 is an enlarged view of a partial area of the sample image frame 200 according to an embodiment of Step 109, and the partial area includes a barcode A and a barcode B.

As shown in FIG. 7, all the scan tracks $L_{i-1}$, $L_i$, $L_{i+1}$ pass through the barcode A.

Therefore, the control module 130 may find the sections $B_{i-1}$, $B_i$, $B_{i+1}$ possibly having the barcode on the scan tracks $L_{i-1}$, $L_i$, $L_{i+1}$, respectively. The section Bi possibly having the barcode of the i-th sampling line $L_i$ and the section $B_{i-1}$ possibly having the barcode of the previous scan track $L_{i-1}$ are located at the approximate horizontal axis positions, so that the area $A_i$ possibly having the barcode exists between the two sections ($B_i$, $B_{i-1}$) possibly having the barcodes. The section $B_{i+1}$ possibly having the barcode of the (i+1)th scan track $L_{i+1}$ and the section Bi possibly having the barcode of the previous scan track Li are located at the approximate horizontal axis positions, so that the area $A_{i+1}$ possibly having the barcode exists between the two sections ($B_{i+1}$, B) possibly having the barcodes.

In fact, the aforementioned two areas ($A_i$, $A_{i+1}$) possibly having the barcodes are neighboring areas and are located at the approximate horizontal axis positions. Therefore, the control module 130 still marks the two areas ($A_i$, $A_{i+1}$) possibly having the barcodes as individual areas possibly having the barcode.

For the barcode B, only one scan track $L_j$ passes through the barcode B, so that the control module 130 can only acquire the section $B_j$ possibly having the barcode and cannot find similar sections at the horizontal axis position on the scan tracks ($L_{j-1}$, $L_{i+1}$), and thus the area possibly having the barcode of the corresponding barcode B cannot be acquired. Therefore, the barcode B is ignored by the control module 130.

In order to prevent the barcode B from being ignored, a solution includes the following steps.

The sampling number N of the scan track $L_i$ is increased to guarantee that at least two scan tracks pass through each barcode. Alternatively, by using the zoom-in and zoom-out functions of the image capture module 110 or by changing a distance between the image capture module 110 and the barcode, so as to change an area ratio of the barcode in the preview image and a position of the barcode relative to the scan tracks $L_1$ to $L_n$. Generally, when the image capture module 110 is used to capture the sample image frame 200 having the barcode, and the display panel 141 displays the preview image. The control module 130 can load the scan tracks L1 to $L_n$ at first, and than displays the scan tracks $L_1$ to $L_n$ with the display panel 141. The scan tracks $L_1$ to $L_n$ overlap the preview image and are displayed on the display panel 141. Therefore, the user can change the area ratio of the barcode in the preview image and the position of the barcode relative to the scan tracks $L_1$ to $L_n$ by using the zoom-in and zoom-out functions of the image capture module 110 or by changing the distance between the image capture module 110 and the barcode, such that at least two scan tracks pass through each barcode and the horizontal axis direction of the barcode is in parallel with the scan tracks as much as possible. Subsequently, the user touches the touch-control panel 142 or presses the hardware key of the input device 150 again to send an operation instruction to enable the control module 130 to capture the sample image frame 200 having the barcode and cache the sample image frame 200 in the data storage device 120. In an automatic mode, the user does not need to press the shutter button, and the image capture module 110 will automatically sample and send back 15 to 30 image frames per second in the preview mode and the control module 130 will cache the latest sampling result in the data storage device 120, so as to search for the barcode position by using the method of the present invention.

Referring to FIG. 5, next, the control module 130 adds 1 to the count value i, and the new count value is i=i+1, as shown in Step 111. Subsequently, the steps performed by the control module 130 returns to the start point of the step-loop, that is, starts with Step 105 to perform the step-loop again.

When the control module 130 determines i>N, (that is, the i≦N judgment results in no) in Step 105, it is determined that the control module 130 has completed sample comparison work of all scan tracks $L_1$ to $L_N$. At this time the control module 130 loads the position data of all the found areas $A_i$ possibly having the barcode from the data storage device 120, as in Step 112, so as to perform the further barcode recognition operation (for example, Binarization processing and barcode information recognition).

Based on the aforementioned method, the present invention further provides a computer readable recording medium storing an image processing program 171 for an image processing device 100 to read and execute to perform the following methods. The image processing device 100 acquires a sample image 200. The sample image includes one or a plurality of barcodes. Next, the image processing device 100 defines a plurality of sample lines $L_i$ on the sample image 200. A horizontal axis is defined on the sample image 200 and the sample lines $L_i$ are in parallel with each other and in parallel with the horizontal axis. The image processing device then performs the following sampling steps sequentially along each sample line L. The image processing device acquires pixels at the positions through which the sample line $L_i$ passes on the sample image 200, calculates a gray level value of each pixel on the sample line $L_i$, judges whether the segment $B_i$ possibly having the barcode exists on the sample line $L_i$, determines whether the segments ($B_{i-1}$, $B_i$) possibly having the barcodes of the two neighboring sample lines ($L_{i-1}$, $L_i$) are located at the approximate horizontal axis position, and marks a quadrilateral area between the two segments ($B_{i-1}$, $B_i$) possibly having the barcodes as an area $A_i$ possibly having the barcode. After performing the sampling step for each sample line $L_i$, the image processing device 100 outputs all areas $A_i$ possibly having the barcode to further execute the barcode reading procedure. The details of performing the steps are similar to those of the aforementioned method and will not be repeated herein again. Based on the aforementioned method, the present invention further provides a computer readable recording medium storing an image processing program 171, for an image processing apparatus 100 to read and execute to perform the following steps.

The image processing apparatus 100 acquires a sample image frame 200, in which the sample image frame includes one or a plurality of barcodes. Next, the image processing apparatus 100 defines a plurality of scan tracks $L_i$ on the sample image frame 200, and a horizontal axis is defined on the sample image frame 200, wherein the scan tracks $L_i$ are in parallel with each other and in parallel with the horizontal axis.

The image processing apparatus 100 then performs the following sampling steps sequentially along each scan track $L_i$: acquiring pixels at the positions through which the scan track $L_i$ passes on the sample image frame 200; calculating a gray level value of each pixel on the scan track $L_i$; verifying whether the section $B_i$ possibly having the barcode exists on the scan track $L_i$; determining whether the sections ($B_{i-1}$, $B_i$) possibly having the barcodes of the two neighboring scan tracks ($L_{i-1}$, $L_i$) are located at the approximate horizontal axis position; and marking a quadrilateral area between the two sections ($B_{i-1}$, $B_i$) possibly having the barcodes as an area $A_i$ possibly having the barcode.

After performing the sampling step of each scan track $L_i$, the image processing apparatus 100 outputs all areas $A_i$ possibly having the barcode to further perform the barcode recognition procedure. The details of performing the steps are similar to those of the aforementioned method and will not be repeated herein again.

The image processing method and the image processing apparatus 100 of the present invention make full use of the characteristics of a linear barcode image in which black and white parallel lines are arranged densely and alternately, thereby improving the ability of locating the barcode image area. Therefore, the user does not need to adjust the image capture device 110 repetitively to place the barcode area at the center of the sample image frame, thereby simplifying the use of the recognition program. Meanwhile, the method of the present invention performs multiple sampling within the reasonable program response time, thus improving the recognition efficiency and accuracy, and can be used to find all suspected barcode areas in the image at one time, so that the user does not need to operate the image processing apparatus 100 repetitively to sample different barcodes one by one.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An image processing method of locating and recognizing barcodes in an image frame, for locating and recognizing a barcode in a sample image frame comprising at least one barcode, and the image processing method comprising:
   (a) acquiring a sample image frame;
   (b) defining a plurality of scan tracks on the sample image frame, wherein a horizontal axis is defined on the sample image frame, and the scan tracks are in parallel with each other and in parallel with the horizontal axis;
   (c) performing the following sampling steps sequentially along each of the scan tracks:
      (c1) acquiring pixels at positions through which the scan track passes on the sample image frame;
      (c2) calculating a gray level value of each of the pixels on the scan track;
      (c3) verifying whether a section possibly having the barcode exists on the scan track;
      (c4) determining whether the sections possibly having the barcode of two neighboring scan tracks are located at an approximate horizontal axis position; and
      (c5) marking a quadrilateral area defined by the two sections possibly having the barcode as an area possibly having the barcode; and
   (d) after performing the sampling step on each of the scan tracks, outputting all areas possibly having the barcode.

2. The image processing method as claimed in claim 1, further comprising the steps for determining a sampling number of the scan tracks:
   determining a reasonable program response time;
   obtaining a residual time by deducting a time for barcode information reading on the barcode after each barcode is found from the reasonable program response time; and
   obtaining the sampling number by dividing the residual time by a time for performing the sampling steps on each of the scan tracks.

3. The image processing method as claimed in claim 1, wherein the scan tracks are arranged at an equal interval.

4. The image processing method as claimed in claim 1, wherein the step of acquiring the sample image frame comprises:
   acquiring one image frame from a dynamic image as the sample image frame.

5. The image processing method as claimed in claim 1, wherein the step of acquiring the sample image frame comprises:
   obtaining a single photo as the sample image frame.

6. The image processing method as claimed in claim 1, wherein the step of verifying whether the section possibly having the barcode exists on the scan track comprises:
   defining gray level values of the pixels as a vertical axis and positions of the pixels on the scan track as the horizontal axis, and introducing the gray level value of each pixel to define a gray level curve;
   searching for a section where peaks and valleys of the gray level values densely and alternately appear in the gray level curve; and
   marking the section as the section possibly having the barcode.

7. A non-transitory computer readable recording medium, storing an image processing program for an image processing apparatus to read and execute to perform steps comprising:
   (a) acquiring a sample image frame;
   (b) defining a plurality of scan tracks on the sample image frame, wherein a horizontal axis is defined on the sample image frame, and the scan tracks are in parallel with each other and in parallel with the horizontal axis;
   (c) performing the following sampling steps sequentially along each of the scan tracks:
      (c1) acquiring pixels at positions through which the scan track passes on the sample image frame;
      (c2) calculating a gray level value of each of the pixels on the scan track;
      (c3) verifying whether a section possibly having the barcode exists on the scan track;
      (c4) determining whether the sections possibly having the barcode of two neighboring scan tracks are located at an approximate horizontal axis position; and
      (c5) marking a quadrilateral area defined by the two sections possibly having the barcode as an area possibly having the barcode; and
   (d) after performing the sampling step on each of the scan tracks, outputting all areas possibly having the barcode.

8. The computer readable recording medium as claimed in claim 7, further comprising the steps for determining a sampling number of the scan tracks:
   determining a reasonable program response time;
   obtaining a residual time by deducting a time for barcode information reading on the barcode after each barcode is found from the reasonable program response time; and
   obtaining the sampling number by dividing the residual time by a time for performing the sampling steps on each of the scan tracks.

9. The computer readable recording medium as claimed in claim 7, wherein the scan tracks are arranged at an equal interval.

10. The computer readable recording medium as claimed in claim 7, wherein the step of acquiring the sample image frame comprises:
    acquiring one image frame from a dynamic image as the sample image frame.

11. The computer readable recording medium as claimed in claim 7, wherein the step of acquiring the sample image frame comprises:
    obtaining a single photo as the sample image frame.

12. The computer readable recording medium as claimed in claim 7, wherein the step of verifying whether the section possibly having the barcode exists on the scan track comprises:
    defining gray level values of the pixels as a vertical axis and positions of the pixels on the scan track as the horizontal axis, and introducing the gray level value of each pixel to define a gray level curve;
    searching for a section where peaks and valleys of the gray level values densely and alternately appear in the gray level curve; and
    marking the section as the section possibly having the barcode.

13. An image processing apparatus, applicable to perform image processing on a sample image frame for locating and recognizing a barcode, wherein the sample image frame comprises at least one barcode, and the image processing apparatus comprising:
    an image capture module, for capturing a sample image frame;
    a data storage device, for storing the sample image frame; and a control module, for defining a plurality of scan tracks on the sample image frame, wherein the image processing apparatus is arranged such that:
- a horizontal axis is defined on the sample image frame, the scan tracks are in parallel with each other and in parallel with the horizontal axis; and
- the control module acquires pixels at the positions through which the scan track passes sequentially along each of the scan tracks; calculates a gray level value of each of the pixels on the scan track; verifies whether a section possibly having the barcode exists on the scan track and stores the section possibly having the barcode in the data storage device; determines whether the sections possibly having the barcode of two neighboring scan tracks are located at an approximate horizontal axis position to mark a quadrilateral area between the two sections possibly having the barcode as an area possibly having the barcode.

14. The image processing apparatus as claimed in claim 13, further comprising a display panel for displaying image frames by receiving display signals of the control module.

15. The image processing apparatus as claimed in claim 14, further comprising a touch-control panel combined with the display panel, wherein the touch-control panel is touched to send a corresponding operation instruction to the control module.

16. The image processing apparatus as claimed in claim 13, further comprising an input device, for sending an operation instruction to the control module.

17. The image processing apparatus as claimed in claim 13, wherein the control module estimates a computational capability of the image processing apparatus, and determines the sampling number according to the computational capability.

18. The image processing apparatus as claimed in claim 13, wherein the scan tracks are arranged at an equal interval.

19. The image processing apparatus as claimed in claim 13, wherein the image capture module continuously captures a dynamic image in a dynamic mode and send the dynamic image to the control module, and after receiving an operation signal, the control module takes the last image frame in the dynamic image as the sample image frame.

20. The image processing apparatus as claimed in claim 13, wherein the control module sends a control command to the image capture module, such that the image capture module captures a single photo as the sample image frame.

21. The image processing apparatus as claimed in claim 13, wherein the control module:
- defines gray level values of the pixels as a vertical axis and positions of the pixels on the scan track as a horizontal axis, and introduces the gray level value of each pixel to define a gray level curve;
- searches for a section where peaks and valleys of the gray level values densely and alternately appear in the gray level curve; and
- marks the section as the section possibly having the barcode.

* * * * *